(12) United States Patent
Coppola et al.

(10) Patent No.: US 7,875,186 B2
(45) Date of Patent: Jan. 25, 2011

(54) PROCESS FOR REGENERATING AND PROTONATING A WEAK-BASE ANION EXCHANGE RESIN

(75) Inventors: Edward Coppola, Panama City, FL (US); John Baxley, Lynn Haven, FL (US); Andrea Davis, Panama City, FL (US); Francis Boodoo, King of Prussia, PA (US); William Fries, Warminster, PA (US); James Dale, Cardiff (GB)

(73) Assignees: Applied Research Associates, Inc., Albuquerque, NM (US); Brotech Corporation, Bala Cynwyd, PA (US)

( * ) Notice: Subject to any disclaimer, the term of this patent is extended or adjusted under 35 U.S.C. 154(b) by 500 days.

(21) Appl. No.: 11/287,579

(22) Filed: Nov. 23, 2005

(65) Prior Publication Data

US 2007/0114178 A1    May 24, 2007

(51) Int. Cl.
    *B01J 49/00*    (2006.01)
(52) U.S. Cl. ........................ 210/677; 210/683
(58) Field of Classification Search ................. 210/673, 210/674, 677, 683, 684
See application file for complete search history.

(56) References Cited

U.S. PATENT DOCUMENTS

| | | | |
|---|---|---|---|
| 2,404,367 A | | 7/1946 | Durant et al. |
| 3,417,016 A | * | 12/1968 | Yagishita ............... 210/673 |
| 3,531,401 A | * | 9/1970 | Crits ............... 210/677 |
| 4,036,751 A | * | 7/1977 | Orita et al. ............... 210/662 |
| 4,172,185 A | | 10/1979 | Petheram |
| 5,098,579 A | * | 3/1992 | Leigh et al. ............... 210/724 |
| 6,066,257 A | | 5/2000 | Venkatesh et al. |
| 6,077,432 A | | 6/2000 | Coppola et al. |
| 6,448,299 B1 | | 9/2002 | Brown et al. |
| 6,878,286 B2 | | 4/2005 | Jensen et al. |
| 6,905,111 B2 | | 6/2005 | Nagasaka et al. |
| 6,908,560 B2 | | 6/2005 | Guter |
| 2005/0269269 A1 | * | 12/2005 | Jensen et al. ............... 210/670 |

FOREIGN PATENT DOCUMENTS

GB    2060430 A   *   5/1981

* cited by examiner

*Primary Examiner*—Matthew O Savage
(74) *Attorney, Agent, or Firm*—Dinsmore & Shohl LLP; Monika J. Hussell (57) ABSTRACT

The invention consists of a water treatment process using selective and regenerable weak base anion exchange resins to remove any number of complex anions, especially oxyanions including perchlorate, nitrate, chlorate, arsenate, selenate, and chromate, from aqueous solutions. The treatment process is comprised of three key processes including 1) pretreatment to lower pH, 2) ion exchange, and 3) post treatment to adjust pH and alkalinity. The invention also includes processes for regenerating weak base anion resins and treatment of the residuals generated. This invention employs pressurized treatment, carbon dioxide management, and reuse of regenerating solution to minimize pumping and treatment costs.

19 Claims, 9 Drawing Sheets

PROCESS FOR REGENERATING AND PROTONATING A WEAK-BASE ANION EXCHANGE RESIN

STATEMENT REGARDING FEDERALLY SPONSORED RESEARCH

The U.S. Government has certain rights in this invention, as provided for by the terms of Contract No. #W912HQ-04-C-0026 awarded by the Environmental Security Technology Certification Program (ESTCP) Office.

BACKGROUND OF THE INVENTION

Ion exchange technology specifically addressing removal of perchlorate ($ClO_4^-$) and nitrate ($NO_3^-$) from groundwater, drinking water, or process waste streams is a relatively recent art utilizing strong base anion (SBA) resins. Using SBA resins, anions in aqueous solution, such as perchlorate and nitrate, exchange with stoichiometrically equivalent amounts of exchangeable anions on the resin surface, such as chloride ($Cl^-$) SBA resin technology is practiced as a single use, disposable resin process, or as a regenerable resin process. Single use processes typically employ perchlorate-selective resins such as Purolite A-530E and Rohm and Haas PWA2 for treating water streams containing relatively low concentrations (<1 mg/L) of perchlorate. Non-selective SBA resins, such as Purolite A-600, have been used effectively to treat higher concentrations of perchlorate. The single use approach requires periodic resin replacement and disposal, typically by incineration. The performance and economics of the single-use approach are limited by resin treatment capacity, factors that limit time on-line (channeling, fouling, plugging, bacterial growth, compaction, and agglomeration), resin cost, and incineration cost.

Regenerable SBA resin processes typically use non-selective resins and are regenerated by ion exchange with one molar (6%) or higher concentration salt (sodium chloride or potassium chloride) brine. Regeneration of SBA resins configured as conventional "lead-lag" ion exchange processes result in the production of large volumes of spent brine contaminated with perchlorate, nitrate, sulfate, and other anions. The Calgon Carbon ISEP Process, described in U.S. Pat. No. 6,066,257, is a pseudo-continuous, counter-current ion exchange and regeneration process that uses SBA resins that has been employed to remove perchlorate and nitrate from drinking water. The ISEP process was developed to reduce the amount of waste brine; however, typical waste generation rates are about 1% of the treated groundwater. Other ion exchange processes that use SBA resins, such as the Basin Water Process, described in U.S. Pat. No. 6,878,286, have been developed in an attempt to reduce spent brine to less than 0.5% of the treated water. Waste brine from regeneration is not acceptable to most wastewater treatment plants due to high salt, perchlorate, and/or nitrate content. Catalytic and biological waste brine treatment and reuse technologies have been developed, but they are expensive and have not been reduced to practice.

A novel regeneration approach for SBA resins has been developed using ferric chloride and hydrochloric acid (HCl) to generate the ferrate ion, as described in U.S. Pat. Nos. 6,448,299 and 6,385,396. This approach enables very efficient regeneration of some SBA resins, especially for difficult to remove anions such as perchlorate. However, the primary drawbacks of this approach are materials compatibility, high cost of regenerating solution, handling safety, and difficulty and cost of ferric chloride brine disposal or reuse of either tetrachloroferrate or brine types of waste.

BRIEF SUMMARY OF THE INVENTION

The present invention is an ion exchange process that uses weak base anion (WBA) resins. WBA resins are regenerable and exhibit varying degrees of anion selectivity. All types of WBA resins are suitable for use with the present invention, including, without limitation, styrenic, acrylic, phenol-formaldehyde, poly (vinylpyridine), epoxy amine and cellulosic structure WBA resins. Ion exchange behavior of WBA resins is primarily determined by fixed ionic functional groups attached to the resin. While functional groups of SBA resins remain ionized and capable of ion exchange at almost any pH, at high pH WBA resin functional groups, such as $R-NH_3^+$, lose a proton to form the uncharged $R-NH_2$, which is not able to attract counter anions from solution. Since neutralization of fixed charges increases with pH, the performance of WBA resins is pH-dependent. Unless the water happens to be acidic, maintaining WBA resins in the ionic, or "protonated," form requires pretreatment of the water to reduce pH to below the $pK_a$ value of the WBA resin. By maintaining the water under pressure, dissolved $CO_2$, added or generated during pretreatment, remains in solution. During ion exchange, in acidic conditions, the positively-charged functional groups on the resin surface attract negatively-charged ions in the water, causing anions in the water to become bound ionically to these groups and to simultaneously cause equivalent concentrations of less selected anions to be released into the water.

After the water undergoes ion exchange treatment with the WBA resin, the pH and alkalinity of the treated water are returned to acceptable discharge levels in a post-treatment process. As hereinafter described, the WBA resin treatment process of the present invention is preferably designed to minimize pumping costs (by using, preferably, a single pump) and neutralization costs (by stripping excess dissolved $CO_2$ from the water before neutralization).

A benefit of ion exchange and resin regeneration based on pH is that it allows protonation (anion exchange) and neutralization (regeneration) reactions to proceed with very high chemical efficiency. Since the exchange with base is a neutralization reaction, the reaction will continue to completion. When regeneration is conducted in an ion exchange column, instead of a batch process, the effective separation factor is very large and a self-sharpening front is established, which enables very efficient regeneration. Furthermore, the regeneration of WBA resins can be performed with an amount of base only slightly greater than the equivalent amount of anions exchanged on the resin, which offers an economic advantage over SBA resin systems requiring a large excess of regenerating brine. In addition to lower operating and maintenance costs, the present invention results in a straight-forward and simple regeneration process that produces small volumes of spent regenerating solutions that are much easier to treat, reuse, or dispose of, than the brine or tetrachloroferrate ion type waste generated by SBA resin regeneration processes.

The anion exchange process of the present invention and the embodiments thereof disclosed in this application are intended for use with aqueous compositions, including without limitation contaminated surface water, groundwater, drinking water, chemical process streams, process waste water, and salt brine from the regeneration of SBA exchange resins. The processes of the present invention may be performed under normal ambient conditions and temperatures.

Preferably, ion exchange is performed at a lower temperature (0 C-30 C), and regeneration of the resin is performed at higher temperatures (30 C-100 C).

LIST OF FIGURES

FIGS. 10A, 10B and 10C are block flow diagrams of scavenger SBA resin treatment configurations, with FIG. 10A showing caustic batch regeneration and rinse application.

DETAILED DESCRIPTION OF THE INVENTION

The present invention comprises a water treatment process using WBA resins to remove complex anions, especially oxyanions including perchlorate, nitrate, chlorate, arsenate, selenate, and chromate, from aqueous solutions. The treatment process is comprised of a series of processes with the aqueous solution, including 1) pretreatment to lower pH, 2) ion exchange, and 3) post treatment to adjust pH and alkalinity. The invention also includes processes for regenerating WBA resins and for treatment of the residuals produced during the WBA resin regeneration.

Figure 1:
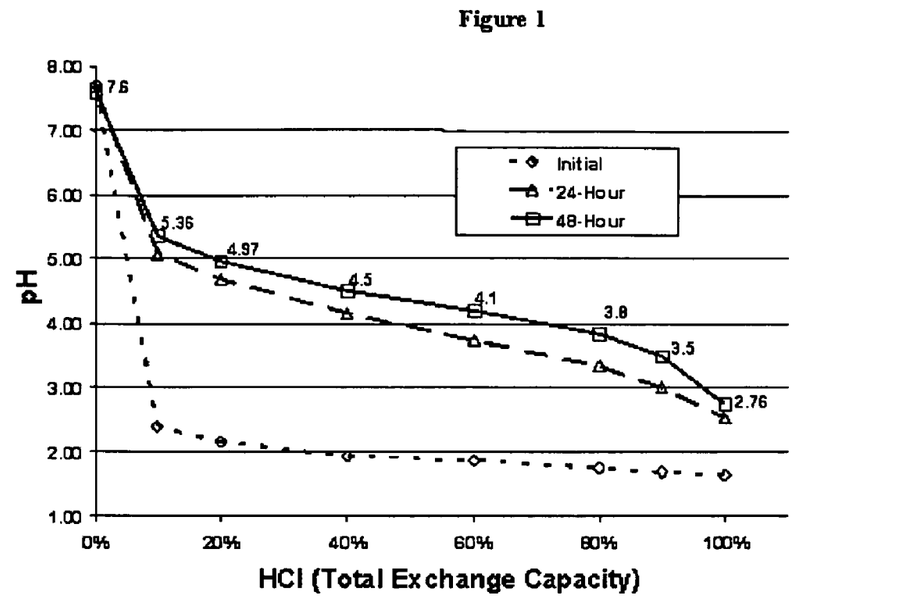
FIG. 1 is a titration curve for a macroporous polystrene-divinylbenzene WBA resin, showing that ion exchange capacity is pH and time dependent.

1. WBA Resin. The invention uses WBA resins as the media for removing complex anions from aqueous solutions. As discussed above, the ion exchange capacity of a WBA resin is dependent on the operating pH of the aqueous solution, and can be determined as a function of pH by titration. FIG. 1 shows the titration curve of a typical macroporous polystyrene-divinylbenzene WBA resin. From the titration curve of this resin, an effective operating range from pH 3.0 to 5.0 is projected. To determine optimal operating pH for a given environment, anion selectivity, equipment materials of construction, and pretreatment costs should be considered in addition to total anion exchange capacity.

Figure 2:
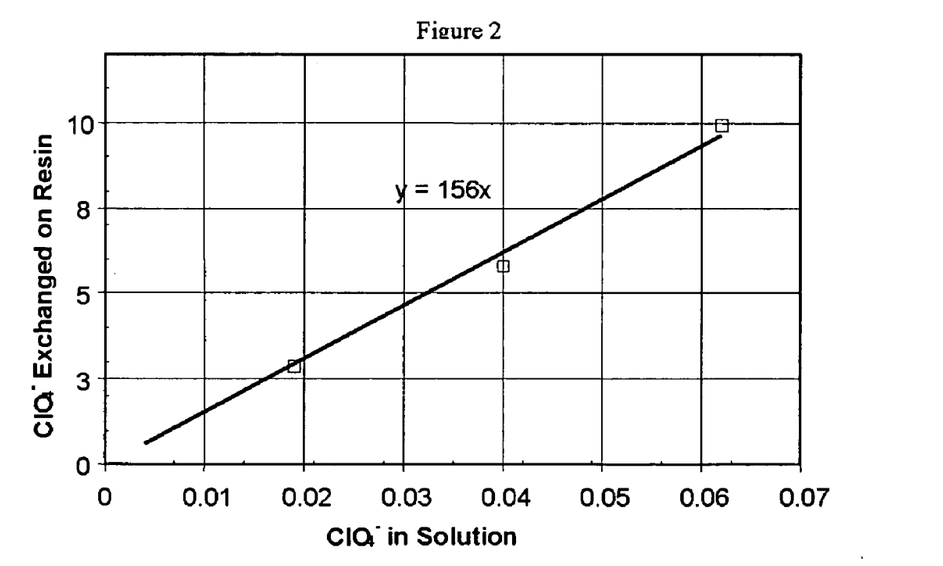
FIG. 2 is a graph of a low-concentration perchlorate ion-exchange isotherm for a perchlorate-selective WBA resin. This isotherm demonstrates performance potential at perchlorate concentrations typically observed in groundwater used for drinking water applications.
Figure 3:
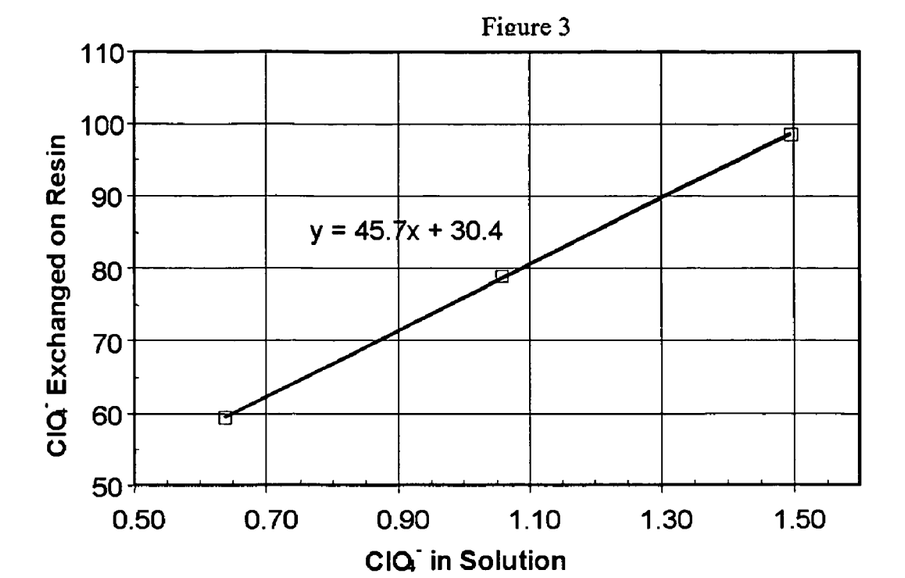
FIG. 3 is a graph of a high-concentration perchlorate isotherm for a perchlorate-selective WBA resin, demonstrating WBA resin capacity for perchlorate with water containing nominally 1 mg/L perchlorate.

When used in accordance with the methods of the present invention, WBA resins effectively remove complex anions from groundwater or drinking water over a broad range of concentrations (less than 0.01 mg/L to more than 1,000 mg/L). As shown in FIG. 2, a low-concentration perchlorate isotherm was obtained at pH 4.0 to show exchange capacity of a perchlorate-selective macroporous polystyrene-divinylbenzene WBA resin in groundwater with typical concentrations of chloride, sulfate, and nitrate. As shown in FIG. 3, a high-concentration perchlorate isotherm was also obtained at pH 4.0 to show exchange capacity of a perchlorate-selective WBA resin at concentrations up to 1.5 mg/L. Ion exchange capacity continues to increase proportional to perchlorate concentration in aqueous solutions, and is effective at concentrations greater than 1,000 mg/L.

Figure 4:
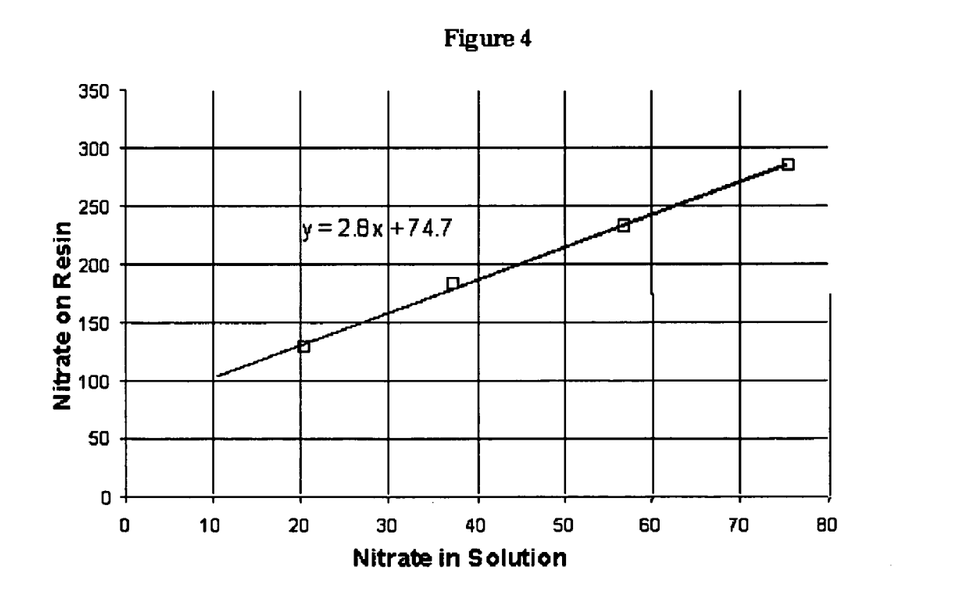
FIG. 4 is a graph of a nitrate isotherm for a WBA resin, demonstrating performance potential at nitrate concentrations typically observed in groundwater used for drinking water applications.

In addition to perchlorate, WBA resins also effectively remove nitrate, chlorate, arsenate, selenate, and chromate from aqueous solutions. As-shown in FIG. 4, a nitrate isotherm was obtained at pH 4.0 to show exchange capacity for a macroporous polystyrene-divinylbenzene WBA resin at nitrate concentrations that require treatment in drinking water (greater than about 40 mg/L).

WBA resins exhibit slow equilibrium kinetics relative to SBA resins, which could result in early breakthrough or leakage. Therefore, it is preferable to operate the ion exchange process at low specific flow rates or with two or more ion exchange vessels configured in series. Complete anion removal and relatively sharp breakthrough curves have been obtained at flow rates from 8 to 24 bed volumes (BV) per hour (1 to 3 gpm per cubic foot of resin).

2. WBA Resin Treatment Process Overview. The WBA resin ion exchange process of the present invention is generally comprised of three processes: pretreatment, ion exchange, and post treatment. The pretreatment and ion exchange processes of the present invention are designed to operate under pressure sufficient to maintain $CO_2$ in solution and designed to allow pretreatment and ion exchange to be accomplished using only one pumping operation. Each pumping operation eliminated saves more than $10 per acre-foot in water pumping cost. The minimum operating pressure necessary to maintain $CO_2$ in solution is partially dependent on feed water alkalinity and the amount of $CO_2$/carbonic acid formed during the pre-treatment process. Typical operating pressure between 5 and 50 psig results in acceptable performance. Operating pressure between 10 and 20 psig permits the use of conventional centrifugal pumps and ion exchange equipment. Pressurized operations also eliminates the need to pump treated water from the ion exchange vessels to the stripping tower for post-treatment.

Figure 5:
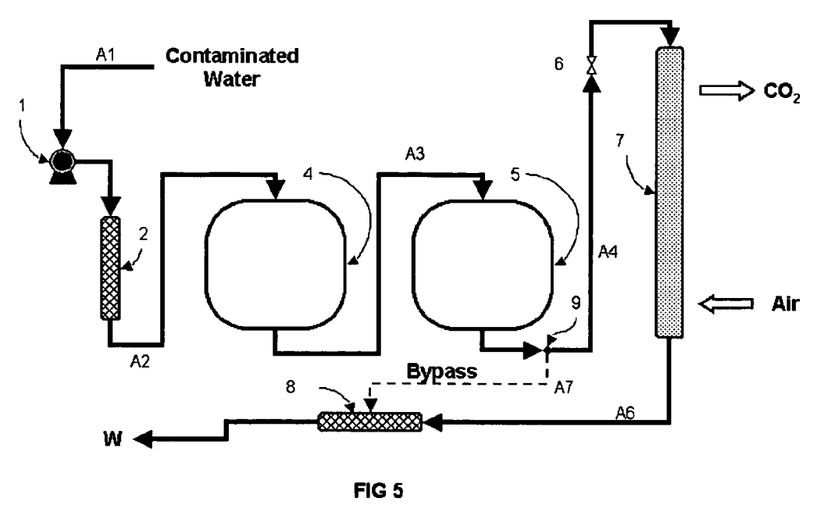
FIG. 5 is a block flow diagram of a WBA resin ion exchange process in a lead-lag configuration in accordance with the present invention.
Figure 6:
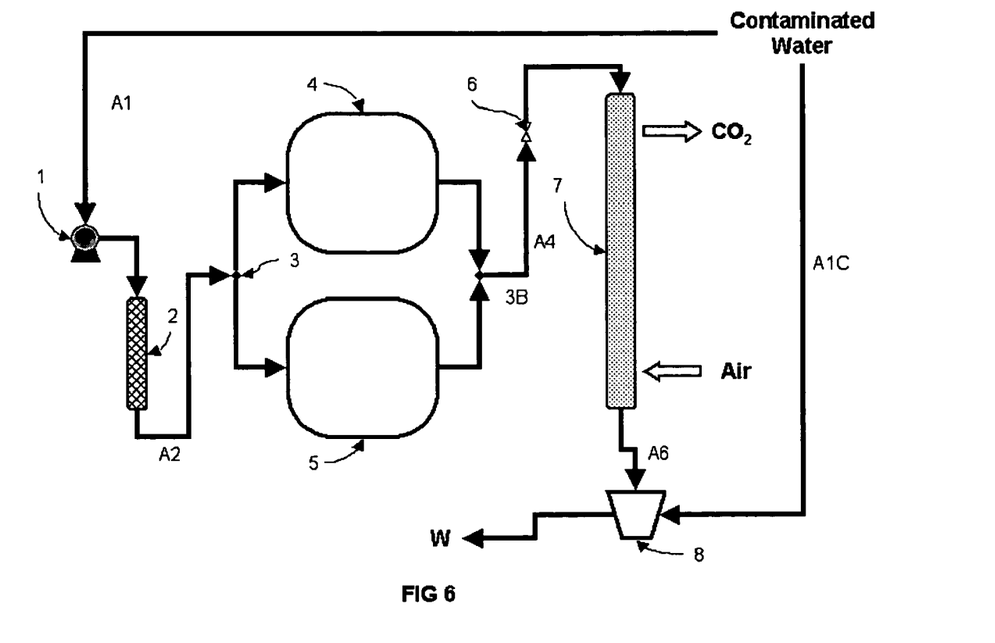
FIG. 6 is a block flow diagram of a WBA resin ion exchange process in a parallel configuration in accordance with the present invention.
Figure 7:
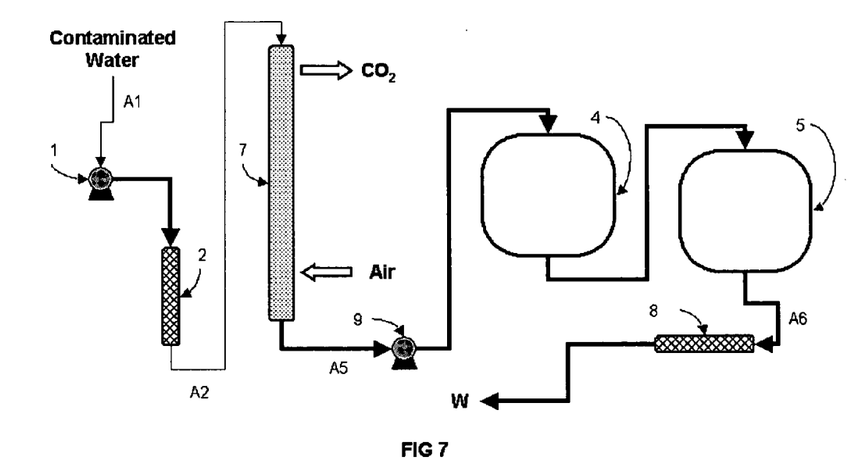
FIG. 7 is a block flow diagram of the WBA resin ion exchange process of FIG. 5, with the stripping tower as a pretreatment step.

The WBA resin treatment process of the present invention may be employed in new, moving bed or pseudo continuous treatment processes such as the Calgon Carbon ISEP process or the Basin Water process, as discussed above. Three embodiments of the system of the present invention are shown in FIGS. 5, 6 and 7. FIG. 5 depicts a lead-lag ion exchange process, employed for high removal efficiencies or for treating low concentrations of target anions, for example treatment of perchlorate contaminated groundwater. FIG. 6 depicts a swing vessel process useful for removing target anions when complete removal to a low concentration is not required (e.g., nitrate removal in a drinking water process). FIG. 7 depicts a pre-treatment stripping process, which is optimal for treating low flow rates (1-1,000 gpm) of wastewater, such as spent brine from strong base anion resin regeneration, where very high concentrations of anions, including bicarbonate, are present.

As shown in FIGS. 5 and 6, feed pump 1 generates the water flow rate and pressure required to maintain dissolved carbon dioxide in solution and overcome pressure drop induced by the pretreatment process and the ion exchange process; backpressure regulator 6 is used to maintain pressure in the ion exchange process. Alternatively, pressure may be maintained in the system by using the head created by the elevation of, or nozzles in, the discharge line A4. For example, routing the discharge line A3 to the top of the stripping tower creates head in the discharge line.

A. Pretreatment Process. The first step of the present invention is to lower the pH of the water feed by adding acid to the contaminated water, under pressure, by means such as an injector. As discussed above, lowering the pH of the water feed allows the WBA resin to be maintained in the protonated form. Any mineral acid (for example, but without limitation, $H_2SO_4$, HCl, $HNO_3$, $H_3PO_4$, and $H_2CO_3$) or organic acid (such as, but not limited to, citric, methane sulfonic, and acetic) may be used to reduce the pH of the water, provided that it does not substantially interfere with ion exchange performance or add undesirable characteristics to the treated water. Furthermore, direct injection of carbon dioxide into the contaminated water would be suitable for use in this process.

The volume of the pretreatment system provides residence time for mixing, allowing hydroxide and carbonate reactions to occur. The residence time required depends on the type of acid used, the bicarbonate concentration and the operating pH. By the addition of acid during pretreatment, carbonate ($CO_3^{2-}$) and bicarbonate ($HCO_3^-$) alkalinity is converted to dissolved carbon dioxide ($CO_2$). Since the $pK_a$ of bicarbonate is 6.37, carbon dioxide will form at standard temperatures and in the pressure range contemplated by this invention, and will remain in solution as carbonic acid as long as the system is maintained under pressure.

The principle of the pre-treatment process is based on manipulation of the carbonic acid equilibrium, as shown below. Carbonic acid ($H_2CO_3$) is formed when atmospheric $CO_2$ is dissolved in water.

1.

2.

3.

4.

Combining Eq (2), (3), and (4),

5.

where
$pKa_1$ $pKa_2$

6.

Figure 8:
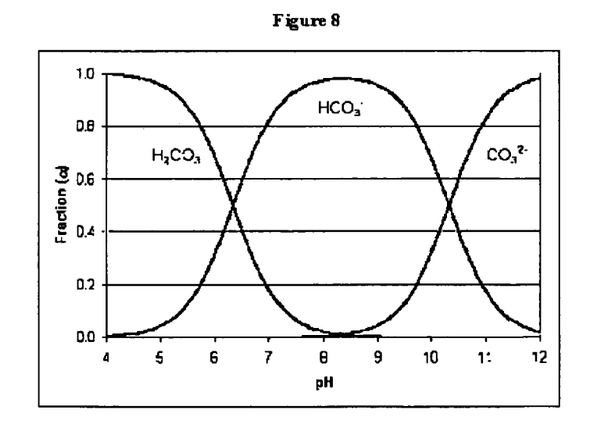
FIG. 8 is a graph showing $CO_2$-bicarbonate-carbonate equilibrium as a function of pH.

Equation 1 is the solubility of carbon dioxide in water, and Equation 6 is the dissociation reaction of carbonic acid. Both of these governing equations, translating into the distribution of species, are a strong function of temperature, pressure, and pH. FIG. 8 summarizes the $CO_2$ equilibrium as a function of pH and pressure. As can be seen, at pH below the $pK_a$ of bicarbonate (<6.37), carbonic acid is the predominant specie. According to Equation 5, carbonic acid is in equilibrium with carbon dioxide. At atmospheric pressure, carbon dioxide will slowly escape from the liquid and reduce the carbonic acid/bicarbonate concentration of the water by driving the equilibrium in Equation 5 to the left. As pressure is increased, more carbon dioxide will remain in solution as a function of partial pressure in the gas above the liquid and solubility, which is inversely proportional to temperature.

To maintain the WBA resin in the protonated state, the pH should be maintained below the $pK_a$ of the particular resin or at or below the pH that provides the desired exchange capacity based on the titration curve for that resin. The optimal pretreatment pH depends on desired exchange capacity, pretreatment and post treatment costs, materials of construction, and competing anions. Operating at a pH range of 4 to 5 provides high exchange capacity while minimizing equipment, pretreatment, and post treatment costs.

As shown in the figures, the contaminated water A1 is transferred into the system under pressure by means of the feed pump 1; the water is then fed into a pressurized static mixer or contact tank 2, where acid is added to the water and mixed to allow the acid to react with carbonates in the feed water and form carbonic acid and dissolved carbon dioxide.

B. Ion Exchange Process. The ion exchange process of the present invention is conducted in conventional vessels that may be configured as single-stage, lead-lag two-stage, multiple-stage series, or multiple-stage parallel (swing) processes. Parallel processes may be employed in conditions requiring frequent regeneration where one vessel is "on-line" while the second vessel is being regenerated. Alternatively, series configurations are employed in two-stage, lead-lag configurations, or in more than two vessels in series. Since the specific water treatment rate is relatively slow, operation using multiple vessels in series is not limited by pressure drop across the ion exchange vessels, since pressure drop is proportional to the flow rate of the process.

Optimal treatment rate depends on the specific WBA resin employed, water composition, and treatment goals. Typical treatment rates using WBA resins are 1 to 5 gpm per cubic foot of resin, or 8 to 40 BV/hour. For many applications, operation at rates of 12 to 24 BV/hour provides an optimal compromise between system size and performance.

In the embodiment shown in FIG. 5, the ion exchange process is conducted in the lead ion exchange vessel 4, which vessel remains online until a predetermined breakthrough of the complex anion is observed in the first output stream A3. The lag ion exchange vessel 5 provides reserve capacity to ensure breakthrough of the complex anion does not occur in the second output stream A4, and enables WBA resin in the lead vessel 4 to achieve optimal loading capacity. After the lead vessel 4 is exhausted, it is removed from service and regenerated, the lag vessel 5 is plumbed to permit operation as the lead vessel and a freshly regenerated vessel is returned to service in the lag position.

In the system depicted in FIG. 6, the ion exchange vessels 4 and 5 are operated in parallel as "swing vessels." While vessel 4 is on line, vessel 5 is regenerated. While vessel 5 is on line, vessel 4 is regenerated. Valve 3 controls water flow to each vessel.

In FIG. 7, where the $CO_2$ is stripped from the water as a pretreatment rather than post treatment process, the degassed water A5 is pumped by a second feed pump 9 to the ion exchange vessels 4 and 5 that may be configured in series (as shown in FIG. 7) or in parallel.

Post Treatment Process. The post treatment process of the present invention comprises pH and alkalinity adjustment to return pretreated, ion-exchanged effluent to acceptable levels before disposition.

Your inventors prefer to neutralize the pH of the effluent by adding a base, preferably a caustic compound, in a static mixer or mixing tank 8 (as shown in FIGS. 5 and 6, until the pH returns to a neutral level. Suitable caustic compounds include sodium hydroxide, soda ash (calcium carbonate), sodium bicarbonate, magnesium hydroxide, or lime (Ca(OH)$_2$), or any other caustic compound that is approved for drinking water use. The base used for a specific application is governed by cost, availability, local water chemistry, and treated water quality requirements.

Figure 9:
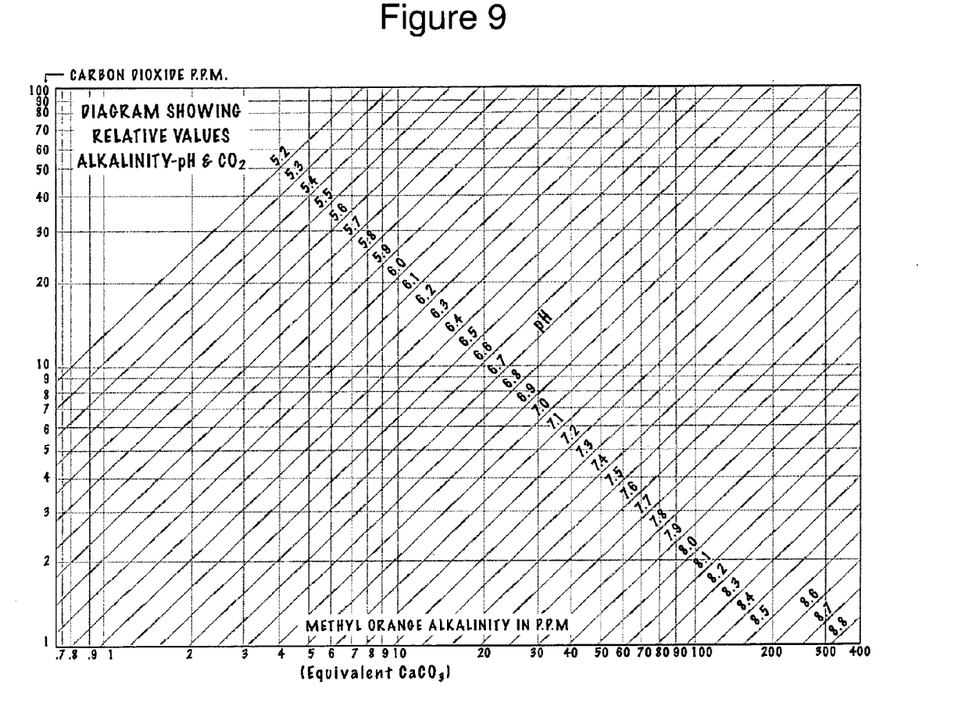
FIG. 9 is a chart showing the relationship of dissolved $CO_2$, alkalinity, and pH.

Alkalinity is controlled by the amount of dissolved $CO_2$ removed prior to, or during, neutralization. During neutralization, residual carbonic acid is converted to bicarbonate. FIG. 9 shows the relationship of dissolved $CO_2$, alkalinity, and pH. Degassing or stripping $CO_2$ from water may be accomplished by a variety of conventional stripping technologies including packed stripping towers (with forced or natural draft) and tray towers. In a system of the present invention as depicted in FIGS. 5 and 6, treated water is delivered to a degasser or stripping tower 7 at atmospheric pressure to remove dissolved carbon dioxide. Stream A6 contains only a small amount of residual carbon dioxide, no alkalinity, but is still acidic from the pretreatment process and ion exchange.

Furthermore, as shown in FIG. 5 residual carbonate can be controlled during post treatment by bypassing a portion of water A7 from the ion exchange process directly to the neutralization basin 8 (without undergoing $CO_2$ stripping). Since the neutralization basin will be maintained at discharge pH (typically 6.5 to 7.5), carbonic acid is quickly converted to bicarbonate before it can escape as $CO_2$ gas. Therefore, by selecting the appropriate base or caustic neutralization agent, post treatment pH, and the amount of the bypass water, properties of the treated water can be accurately controlled to meet requirements for pH and alkalinity in the product water.

In certain treatments (e.g., a nitrate treatment application), no pH adjustment may be necessary when a portion of the contaminated water remains untreated and is recombined with the treated water, because the alkalinity of the untreated stream will be sufficient to neutralize the treated stream after $CO_2$ has been stripped therefrom. As depicted in FIG. 6, stream A4 is degassed in the stripping tower 7, which results in an acidic, treated water A6 with no residual alkalinity. A slipstream of untreated water A1C is blended with treated water A6 in a mixing vessel 8 to yield the blended product water W. The ratio of contaminated water that is treated A6 to untreated water A1C is determined by the concentration of the target anion in the untreated water and the desired concentration in the blended product water. For the process shown in FIG. 6, it is not necessary to add base or caustic in the post treatment process, because the acidic, treated water stream A6 is not buffered by residual alkalinity, and therefore only a small fraction of the alkalinity in the untreated water slipstream A1C is consumed in the process of neutralizing the treated water A6. The pH and alkalinity of the resultant blended product will meet requirements over a broad range of operating scenarios.

Furthermore, as depicted in FIG. 7, in applications involving wastewater treatment, brine treatment, or treatment of streams containing high concentration carbonates, $CO_2$ can be stripped before ion exchange. In these applications, removing alkalinity in the pretreatment step minimizes the neutralization requirement. In this variation, after acid is added in the pretreatment process, dissolved $CO_2$ is removed immediately in a stripping tower 7 before ion exchange. In the post-treatment step, a base, or preferably a caustic, is added to the treated water A6 in a static mixer or mixing tank 8 to adjust the treated water A6 to a neutral pH. Since the treated water has low alkalinity, only a small amount of base or caustic is required.

3. Regeneration. Regeneration of WBA resins is accomplished using a base or caustic solution in water by means of a continuous or batch flow process to neutralize ion exchange sites and elute anions from the resin. The resin is then protonated during an acid rinse before continuing operation. These processes require very little volume of caustic and acid solutions, and the solutions may be re-used to further minimize waste generated.

A. Base Regeneration Process. Base regeneration of WBA resin is accomplished quickly with a small volume of regenerating solution. Typically, excess equivalents of base, based on resin ion exchange capacity, are required for regeneration. Any caustic compound can be used for regeneration. Sodium hydroxide is a preferred caustic compound to prevent scaling or precipitation problems; potassium hydroxide may be preferred for some regeneration applications where it is desirable to precipitate perchlorate or nitrate from regeneration solutions; other preferred bases for the regenerating solution include calcium carbonate, sodium bicarbonate, magnesium hydroxide, lime (Ca(OH)$_2$), ammonia and ammonium hydroxide.

Two approaches are employed with WBA resin regeneration: continuous, single-pass regeneration followed by a rinse, or batch regeneration followed by a rinse. Continuous flow and batch regenerations, as well as rinses, may be conducted down-flow or up-flow.

In regeneration, equivalent or excess equivalents of base or caustic is added to a fixed volume of water; the base may be added at one time, over a period of time, or slowly as controlled by the pH of the regenerating solution. The volume of the regenerating solution may be nominally from 5 BV to as small as process equipment will permit. In batch regeneration, a base or caustic solution is circulated over the resin (down-flow or up-flow) at rates up to several BV/minute, for periods up to several days; typical regeneration rates are 4 to 24 BV/hr, for periods of 4 to 48 hours. Thus, in the regeneration of an exhausted weak-base anion exchange resin, a single batch of regenerating solution is passed over the resin and then captured; the captured regenerating solution is then passed again over the resin, and the cycle is repeated. This recycling of the regenerating solution is performed in a closed-loop manner, without the addition of water or base to the captured regenerating solution. Regeneration may be conducted in-situ, or the resin may be removed from ion exchange vessels for regeneration ex-situ.

Controlling the pH of the regenerating stream provides certain advantages, including preventing thermal stress that occurs from rapid reaction of the caustic with the resin, enabling a smaller volume of regenerating solution to be employed, and minimizing caustic required for regeneration. The pH of the regenerating solution may be adjusted to between 8 and 14 with optimal pH between 11 and 12.5. Higher pH within this suggested range results in more rapid and complete regeneration.

Since the regeneration of WBA resins is a function of pH and not affected by anion concentration, batch regeneration offers several advantages, including minimizing excess caustic consumption and permitting reuse of spent regenerating solution. Furthermore, batch regeneration permits longer regeneration and rinse cycles than can be achieved in a continuous, single-pass regeneration system; as WBA resin ion exchange, neutralization, and diffusion rates are slower than for SBA resins, lengthening regeneration time improves the efficiency and completeness of regeneration.

Following application of the regenerating solution, a pH adjusted water rinse is applied to the resin. Rinse water may be adjusted to a pH of 8 to 14 to improve rinse efficiency.

Spent regenerating solution can be reused, which will proportionally reduce the volume of effluent, proportionally increase the concentration of recovered anions in the regenerating solution, and reduce the caustic required for regeneration. In the case of nitrate removal, spent regenerating solutions may be used as a fertilizer or land-applied, depending on water quality and local requirements. Rinse solutions may also be neutralized and discharged, neutralized and treated, combined with contaminated feed water and retreated, or combined with treated water in the post treatment process.

B. Acid Protonation Process. Regenerated WBA resins must be protonated at low pH using a mineral or organic acid prior to return to operation. Acid protonation of WBA resin is accomplished quickly with a small volume of acidic solution; your inventors prefer to use sulfuric acid as this protonation solution because of its reasonable cost and safety issues. Typically, excess equivalents of acid, based on resin ion exchange capacity, are required for protonation.

WBA resin protonation can be accomplished either by continuous, single-pass protonation, or batch protonation, and either may be conducted down-flow or up-flow. Since treated water will undergo post treatment for pH and alkalinity adjustment, it is not necessary to rinse the resin after protonation.

Spent protonating solution may be neutralized and disposed after a single use, reused several times, combined with contaminated feed water and treated by means of the present invention, or used to neutralize and dilute waste caustic regenerating solution before discharge or biodegradation.

For continuous, single-pass protonation, excess equivalents of acid is added to a fixed volume of water. Rates typical for regeneration of WBA resins (~4 BV/hr) may be employed. The volume of the protonating solution may be nominally from 5 BV to as small as process equipment will permit. If used, rinse water pH should be adjusted to or below the pretreatment pH to prevent neutralization of functional groups on the WBA resin.

Since the degree of protonation of WBA resins is a function of pH, batch-wise protonation offers several advantages, including minimizing excess acid consumption, permitting extended protonation time, and permitting reuse of spent protonating solution. Batch protonation may be conducted in-situ or the resin may be removed from ion exchange vessels for protonation ex-situ. During batch protonation, the acidic solution is circulated over the resin (down-flow or up-flow) at rates up to several BV/minute, for periods up to several days. Typical protonation rates are 4 to 24 BV/hr, for periods of 4 to 48 hours.

The acid required for protonation may be added at one time, over a period of time, or slowly as controlled by the pH of the protonating solution. Controlling the pH of the protonating stream provides several advantages, including preventing thermal stress that could occur from rapid reaction of the acid with the resin; enabling a smaller volume of protonating solution to be employed, and minimizing the acid required for protonation. The pH of the protonating solution may be adjusted between 0 and 6, with optimal pH between 1.5 and 3. Lower pH results in more rapid and complete protonation. Reuse of the protonating solution will proportionally reduce the volume of effluent and reduce the acid required for protonation.

4. Residual Treatment. Spent base or caustic regenerating and rinse solutions may be treated by various methods, including a secondary ion exchange scavenger process using an SBA resin, and known methods of biodegradation.

A. Effluent Treatment by Ion Exchange. A secondary ion exchange scavenger process, using an SBA resin, may be employed to effectively remove complex anions such as perchlorate, chromate, and arsenate present in spent base or caustic regenerating and rinse solutions. Removal of complex anions by an SBA scavenger ion exchange process facilitates reuse of regenerating solutions and rinse water and permits disposal of spent regenerating solutions and rinse water as a non-hazardous material. Since spent regenerating solutions will contain much higher concentrations of anions than the source water being treated, very large quantities of anions can be exchanged onto the SBA scavenger resins. This "superloading" of SBA resins results in a large reduction in the volume of resin that must be disposed as a hazardous waste, or by incineration, compared to direct treatment of the source water by an SBA resin or other media.

The optimal approach for employing a scavenger resin is to use the same resin for both rinse water clean up and treatment of regenerating solution, in a sequential operation. Complete removal of anions from the resin during the rinse process prevents possible re-exchange of target anions into the treated water during the ion exchange process. Since complete anion exchange and diffusion from WBA resin is relatively slow, large volumes of rinse water may be needed. The rinse water may be disposed of or combined with contaminated feed water and retreated in the WBA resin ion exchange process. Retreating rinse water reduces treatment capacity and increases the frequency of regeneration. As depicted in FIG. 10C, an SBA scavenger resin 33 installed in the circulation loop of a batch rinse process effectively removes select complex anions from the rinse water stream, minimizes the volume of rinse water required, extends the duration of the rinse process, and minimizes complex anion residual on the WBA resin. The SBA resin used in the batch rinse process is then used in a single pass treatment of the regenerating solution. SBA resin vessels are optimally configured with two or more vessels in series. Fully exhausted scavenger resin may be incinerated. Partially exhausted scavenger resin vessels may be reconfigured in lead-lag fashion to provide additional treatment.

Figure 10A:
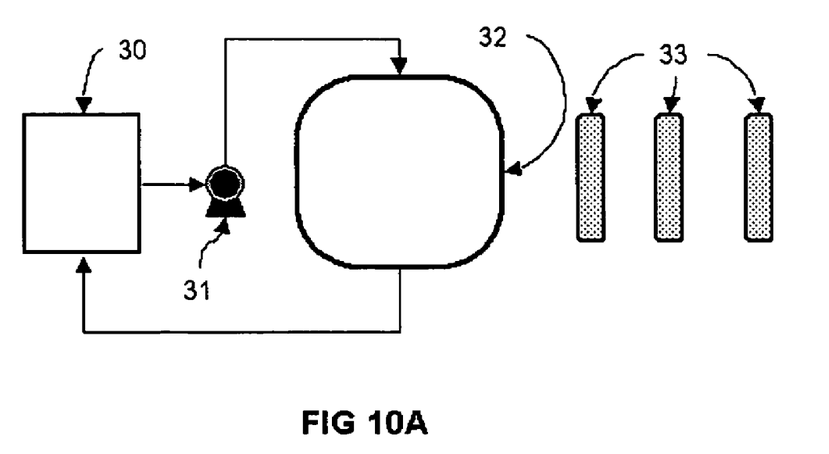
Figure 10B:
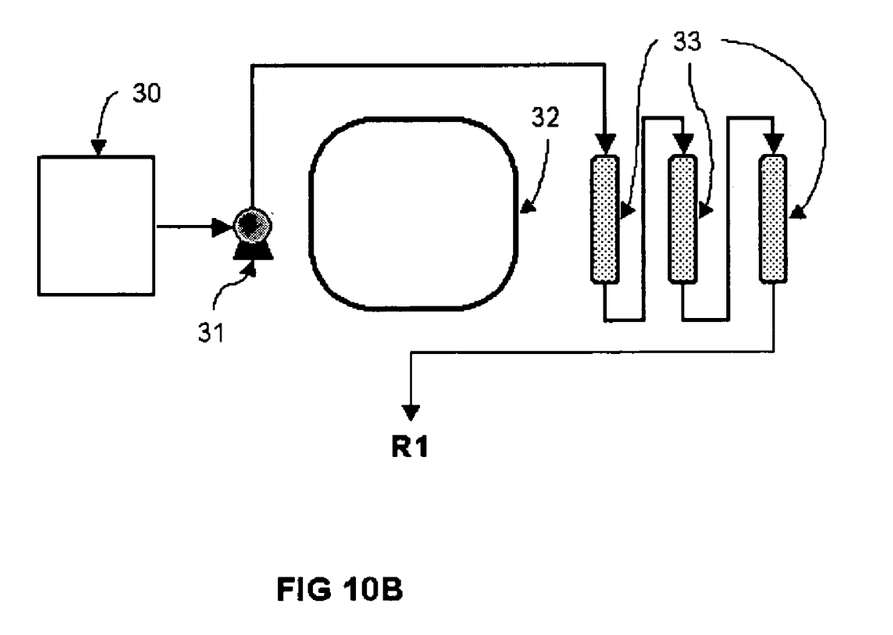
FIG. 10B showing a scavenging process for spent caustic from the regeneration and rinse applications.
Figure 10C:
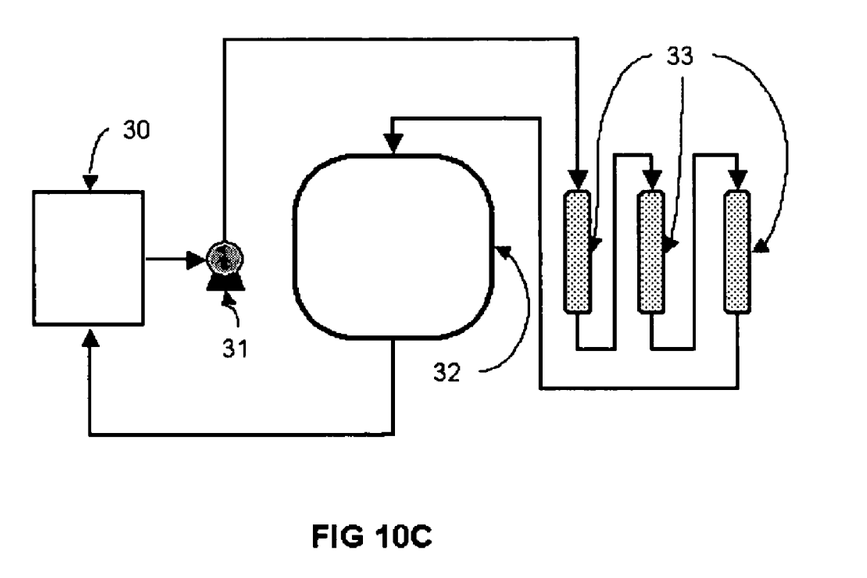
FIG. 10C showing a caustic rinse application, with inline scavenging of the rinse solution.

An embodiment of the regeneration, rinse, and secondary ion exchange scavenger processes is depicted in FIGS. 10A-10C. As shown in FIG. 10A, a regeneration tank 30, having clean water and a base or caustic for regeneration of the ion exchange vessel, is put inline with a feed pump 31, that feeds the regeneration solution to and through the ion exchange vessel having spent WBA resins therein; the regeneration solution then returns to the regeneration tank 30 to complete the cycle. A rinse may be applied to the ion exchange vessel 32 using the same process and configuration. After regeneration, the spent caustic may be scavenged by pumping the solution from the regeneration tank 30, by means of the feed pump 31, to the scavenger SBA resin vessels 33; once the water passes through the SBA scavenger vessels 33, it is suitable for reuse in the regeneration process. As depicted in FIG. 10C, the rinse cycle within the regeneration process may be performed using a similar configuration to that depicted in FIG. 10B, by passing the treated regeneration solution W into the ion exchange vessel 32, and back to the regeneration tank 30.

B. Effluent Treatment by Precipitation. Precipitation processes may be employed to effectively remove anions such as arsenate, chromate, chromite, nitrate, perchlorate, and selenate present in spent base or caustic regenerating solutions. Removal of anions by a precipitation process enables repeated reuse of regenerating solutions, reduces the volume of waste regenerating solutions, and permits the recovery of salt compounds that have commercial value. Precipitation processes are particularly well suited to for the WBA resin treatment of water that has a high concentration of target anions and where the anion concentration of the spent regenerating solution is increased to high levels by repeated reuse. Salts of barium, calcium, and potassium are used to remove target anions from solution by precipitation of sparingly soluble salts such as barium arsenate, barium chromate, barium chromite, barium nitrate, barium selenate, barium sulfate, calcium arsenate, calcium chromite, calcium sulfate, potassium nitrate, and potassium perchlorate. Precipitated salt recovery efficiencies and purity are optimized by regenerating at elevated temperature, up to the thermal stability limit of a particular resin, and by precipitating at ambient or sub ambient temperature, which is the typical practice for crystallization processes.

C. Effluent Treatment by Biodegradation. Effluent from the regeneration and rinse process will be high pH and may contain high concentrations of perchlorate, nitrate, and other complex anions. Local regulations may require neutralization and removal of one or more of these anions before discharge to municipal sewage treatment plants. The biodegradation process as described in U.S. Pat. No. 6,077,432 effectively removes both nitrate and perchlorate from regenerating solutions and rinse water. Depending on the composition of the spent regenerating solution, dilution may or may not be required. Dilution using rinse water, plant water, potable water, or water used for protonation is necessary if the total dissolved solids concentration of spent regenerating solution is above 2 to 3%. Neutralization is also required before biodegradation. Biodegraded regenerating solution will contain no detectable amounts of nitrate or perchlorate and can be discharged to a local sewage treatment plant.

Example 1

Figure 11:
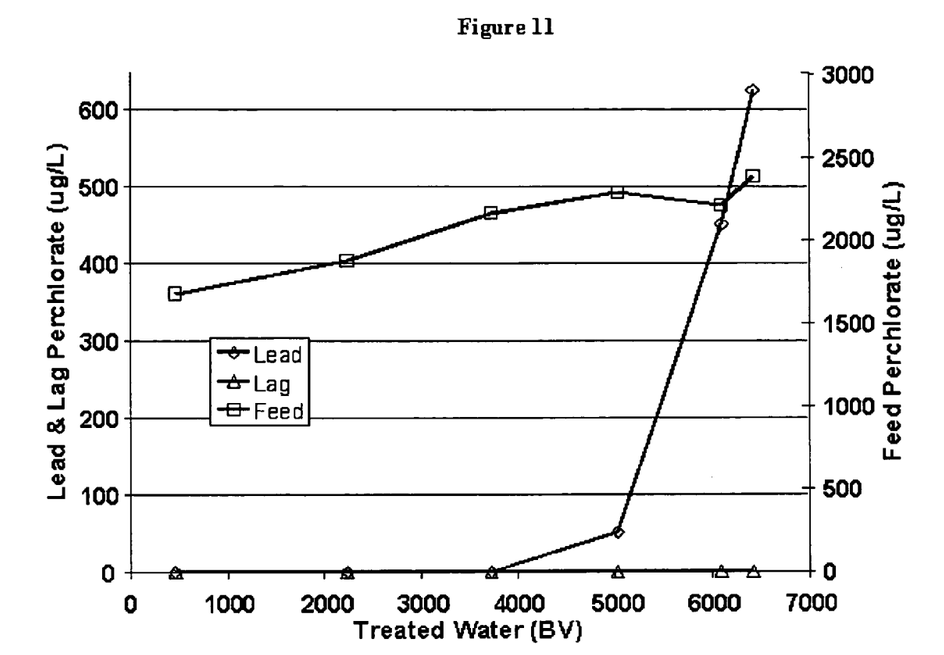
FIG. 11 is a graph of WBA resin test performance showing perchlorate concentration in untreated water and in treated water after the first and second column in a lead-lag configuration.

Treatment Capacity: FIG. 11 shows the results of a pilot column test conducted at 18 BV/hr and pH 4 on a groundwater containing approximately 2.1 mg/L perchlorate, 5 mg/L nitrate, 25 mg/L chloride, and 155 mg/L sulfate. The test was conducted in two, 2-inch diameter by 36-inch long columns connected in series. A perchlorate-selective, macroporous polystyrene-divinylbenzene WBA resin was used to attain a treatment capacity over 6,000 BV.

Example 2

Figure 12:
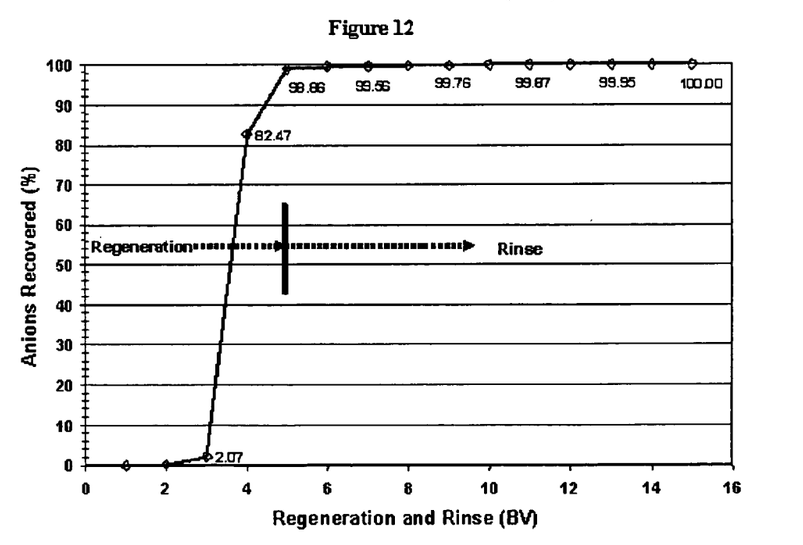
FIG. 12 is a graph showing WBA resin regeneration efficiency, showing WBA resin regeneration as a function of bed volumes of regeneration solution.

Regeneration: Rapid and complete regeneration was demonstrated by continuously flowing 5 BV of caustic regenerating solution followed by 10 BV of dilute caustic rinse water. The 5 BV of caustic regenerating solution contained 180% of the total estimated exchange equivalents (80% excess equivalents) of the macroporous polystyrene-divinylbenzene WBA resin tested and the rinse water was 0.01 Normal sodium hydroxide solution. FIG. 12 shows that the regenerating solution resulted in rapid regeneration using a very small volume of regenerating solution. Repeated regeneration, protonation, and ion exchange cycles demonstrated consistent mass recovery of 98% of the exchanged perchlorate.

Example 3

Scavenging Regenerating Solutions. An ion exchange scavenging process was used to remove perchlorate from spent regenerating and rinse solutions. A strong base anion resin (Purolite A600) was used as the scavenger resin. Two liters of a macroporous polystyrene-divinylbenzene WBA resin was regenerated using 3 BV of caustic regenerating solution maintained at pH 12.5 by the addition of caustic. This solution was circulated through a perchlorate-loaded WBA resin column at a rate of 80 ml/min (5 BV/hr) as depicted in the regeneration frame of FIG. 10A. After 48 hours of circulation, the spent regenerant was collected and retained for subsequent scavenger resin treatment. The spent regenerant contained 163 miliequivalents perchlorate.

The WBA resin column was configured in series with scavenger resin vessels as depicted in FIG. 10C. Each scavenger column contained 90 cc of Purolite A600 resin. The rinse flow rate was 45 ml/min (30 BV/hour for each scavenger column and 1.35 BV/hour for the WBA resin test column. The rinse water was maintained at pH 12.5. The scavenger resin removed all the perchlorate from the circulating caustic rinse. After 48 hours of circulation, the perchlorate concentration of the effluent from the WBA resin column had decreased from over 1800 ppb to less than 50 ppb. This level of rinse was demonstrated to removal perchlorate to the level necessary to prevent bleed or elution of perchlorate from a regenerated column.

The same resin used for scavenging the rinse water was used to scavenge the spent caustic regenerating solution. The columns were configured as depicted in the caustic scavenging frame of FIG. 10B. The spent caustic regenerant was pumped through the columns in a single pass, down-flow, at a rate of 10 BV/hour. Perchlorate was completely removed from the regenerating solution. Analysis for perchlorate was below the detection limit of 4 ppb. The treated regenerating and rinse solutions can be reused, blended with product water, or discharged to sewer.

What is claimed is:

1. A process for regenerating and protonating exhausted weak-base anion exchange resins, wherein the process is capable of minimizing the volume of regenerating solution and chemicals required for regeneration, said process comprising the steps of:
    a. providing an exhausted weak-base anion exchange resin;
    b. regenerating said exhausted weak-base anion exchange resin by a process consisting of the steps of:
        i. providing a batch of caustic regenerating solution;
        ii. circulating the batch of regenerating solution through said exhausted weak-base anion exchange resin to neutralize ion exchange sites on the resin, convert the resin to a free-base form, and elute anions from the resin to provide a regenerated resin, by (1) passing the batch of regenerating solution over the resin, (2) capturing the regenerating solution passed over the resin, (3) passing the captured regenerating solution over the resin, and (4) repeating steps (2) and (3), wherein said steps are performed in a closed-loop manner, without the addition of water or base to the captured regenerating solution until the resin is regenerated; and
    c. protonating said regenerated resin by a process comprising the steps of:
        i. providing a batch of acidic protonating solution; and
        ii. circulating the batch of acidic protonating solution through the regenerated resin to restore the resin to an ionized, active form,
    wherein no additional batches of caustic regenerating solution are added between steps a and b.

2. The process of claim 1, wherein the step of circulating the caustic regenerating solution through a weak-base anion resin is performed up-flow in a batch, closed-loop process.

3. The process of claim 1, wherein the caustic regenerating solution comprises an aqueous solution of a base, wherein the amount of base used is equal to the minimum theoretical amount required to fully convert the resin to the free-base form, which is equivalent to the ion exchange capacity of the weak-base anion resin.

4. The process of claim 3,
further comprising the step of rinsing the regenerated resin with a pH adjusted water rinse having a pH of between 8 and 14, and
wherein the base of said aqueous solution is selected from the group consisting of soda ash (sodium carbonate), calcium carbonate, magnesium hydroxide, potassium hydroxide, lime ($Ca(OH)_2$), ammonia, and ammonium hydroxide.

5. The process of claim 3, wherein the pH of said aqueous solution is between 11 and 12.5.

6. The process of claim 3, wherein said acid of the acidic aqueous solution is an organic acid.

7. The process of claim 1 or 3, wherein the acidic protonating solution comprises an aqueous solution of an acid, wherein the amount of acid used is equal to the minimum theoretical amount required to fully convert the resin to the ionized or protonated form, which is equivalent to the ion exchange capacity of the weak-base anion resin.

8. The process of claim 7, wherein said acid of the acidic aqueous solution is a mineral acid.

9. The process of claim 8, wherein said acid of the acidic aqueous solution is sulfuric acid.

10. The process of claim 7, wherein the step of circulating the acidic protonating solution through a weak-base anion resin is performed by means of a batch, closed-loop process.

11. The process of claim 1, wherein the step c(ii) of circulating the batch of protonating solution through the regenerated weak-base anion exchange resin comprises the steps of (1) passing the batch of protonating solution over the resin, (2) capturing the protonating solution passed over the resin, (3) passing the captured protonating solution over the resin, and (4) repeating steps (2) and (3).

12. The process of claim 11, wherein the batch of protonating solution circulated through the regenerated resin has a volume of no more than five times the bed volume of the resin; and wherein the steps (2), (3) and (4) are conducted so as to pass 4-24 bed volumes of the protonating solution through the resin per hour, for a period of 4 to 48 hours.

13. The process of claim 1, wherein the batch of caustic regenerating solution circulated through the exhausted resin has a volume of no more than five times the bed volume of the resin; and wherein the step b(ii) is conducted so as to pass 4-24 bed volumes of the regenerating solution through the resin per hour, for a period of 4 to 48 hours.

14. The process of claim 1, further comprising the step, after regenerating the resin, of passing the regenerating solution through a strong base anion resin, thereby removing anions from the regenerating solution.

15. The process of claim 1, further comprising the step, after regenerating the resin, of adding soluble salts selected from the group consisting of barium, calcium and potassium to the regenerating solution, to precipitate anions from the regenerating solution.

16. The process of claim 1, further comprising the step, after regenerating the resin, of applying a water rinse to the regenerated resin.

17. The process of claim 16, wherein the water rinse is applied to the regenerated resin in a batch process.

18. The process of claim 16, further comprising the step of removing anions from the rinse solution by means of a strong-base anion scavenger resin.

19. The process of claim 18, wherein said strong base anion scavenger resin is incorporated in the loop of the batch rinse process.

* * * * *